(12) United States Patent
Bai

(10) Patent No.: US 8,999,014 B2
(45) Date of Patent: Apr. 7, 2015

(54) SYSTEMS AND METHODS FOR PRODUCING ENGINEERED FUEL FEEDSTOCKS WITH REDUCED CHLORINE CONTENT

(71) Applicant: MPH Energy LLC, Rutland, VT (US)

(72) Inventor: Dingrong Bai, Rutland, VT (US)

(73) Assignee: Accordant Energy, LLC, Rutland, VT (US)

( * ) Notice: Subject to any disclaimer, the term of this patent is extended or adjusted under 35 U.S.C. 154(b) by 0 days.

(21) Appl. No.: 13/891,530

(22) Filed: May 10, 2013

(65) Prior Publication Data

US 2013/0298455 A1 Nov. 14, 2013

Related U.S. Application Data

(60) Provisional application No. 61/645,999, filed on May 11, 2012, provisional application No. 61/786,951, filed on Mar. 15, 2013.

(51) Int. Cl.

| C10L 5/40 | (2006.01) |
| C10L 1/12 | (2006.01) |
| C10L 1/28 | (2006.01) |
| C10L 9/08 | (2006.01) |
| C10L 5/36 | (2006.01) |

(52) U.S. Cl.
CPC . C10L 5/406 (2013.01); C10L 9/08 (2013.01); Y02E 50/30 (2013.01); C10L 2290/24 (2013.01); C10L 2290/30 (2013.01); C10L 2290/02 (2013.01); C10L 2290/54 (2013.01); C10L 5/363 (2013.01); C10L 2290/28 (2013.01); C10L 2230/02 (2013.01); C10L 2200/029 (2013.01)

(58) Field of Classification Search
CPC ........... C10L 5/406; C10L 5/363; C10L 9/08; C10L 2290/24; C10L 2290/30; C10L 2290/02; C10L 2290/54; C10L 2290/28; C10L 2230/02; C10L 2200/29; Y02E 50/30
USPC .................................................. 44/320, 589
See application file for complete search history.

(56) References Cited

U.S. PATENT DOCUMENTS

| 4,179,263 | A | | 12/1979 | Jung et al. |
| 4,529,407 | A | | 7/1985 | Johnston et al. |
| 4,822,379 | A | | 4/1989 | Thompson |
| 4,961,391 | A | | 10/1990 | Mak et al. |
| 5,464,602 | A | | 11/1995 | Evans et al. |
| 5,780,696 | A | | 7/1998 | Bauer |
| 5,980,595 | A | * | 11/1999 | Andrews ......................... 44/530 |
| 6,112,675 | A | | 9/2000 | Potter et al. |
| 6,202,577 | B1 | | 3/2001 | Boguslavsky et al. |
| 6,329,496 | B1 | | 12/2001 | Komaki et al. |
| 6,346,220 | B1 | | 2/2002 | Kosugi et al. |
| 6,635,093 | B1 | | 10/2003 | Schoen et al. |
| 6,774,271 | B2 | | 8/2004 | Jiang |
| 6,840,184 | B2 | | 1/2005 | Eberhardt et al. |
| 6,881,303 | B2 | | 4/2005 | Inoue et al. |
| H2198 | H | | 8/2007 | Quimby |
| 7,611,576 | B2 | | 11/2009 | Rabiner |
| 7,892,500 | B2 | | 2/2011 | Carner |
| 8,231,696 | B2 | | 7/2012 | Ruiters |
| 2003/0221363 | A1 | | 12/2003 | Reed |
| 2009/0205546 | A1 | | 8/2009 | Kluko |
| 2009/0272027 | A1 | * | 11/2009 | Ruiters ........................... 44/505 |
| 2010/0218419 | A1 | | 9/2010 | Bai |
| 2011/0099890 | A1 | * | 5/2011 | Bohlig et al. ................... 44/320 |

FOREIGN PATENT DOCUMENTS

EP 0890629 A1 1/1999
WO WO2008/107042 A2 9/2008

OTHER PUBLICATIONS

Weinell et al. "Hydrogen Chloride Reaction with Lime and Limestone: Kinetics and Sorption Capacity" Ind. Eng. Chem. Res. 1992, 31(1), pp. 164-171.
Li et al. "Reaction Kinetics of Hydrogen Chloride with Calcium Oxide by Fourier Transform Infrared Spectroscopy" Ind. Eng. Chem. Res. 2000, 39, pp. 1898-1902.
Castro et al. "Kinetic Study of Thermal De-Chlorination of PVC-Containing Waste" Wastes: Solutions, Treatments and Opportunities, $1^{st}$ International Conference, Sep. 12-14, 2011, 6 pages.
Asanuma et al. "Development of PVC Dechlorination Process" Materials and Processing Research Center, NKK Corporation, Degradation Extrusion, 4 pages.
Tongamp et al. "Simultaneous Treatment of PVC and Oyster-Shell Wastes by Mechanochemical Means" Institute of Multidisciplinary Research for Advanced Materials, Tohoku University 2-1-1, Katahira 5 pages.
Beyler et al. "Thermal Decomposition of Polymers" Section 1, Chaper 7, pp. 1-110-1-131.
International Search Report and Written Opinion for International Application No. PCT/US2013/40597, mailed Dec. 6, 2013.
Minoru Asanuma, Tatsuro Ariyama, and Mikoto Iemoto; Development of Dechlorination Process for PVC in Waste Plastics; Jun. 2, 1999; p. 221.

* cited by examiner

Primary Examiner — James Goloboy
Assistant Examiner — Latosha Hines
(74) Attorney, Agent, or Firm — Cooley LLP

(57) ABSTRACT

Systems and methods for producing engineered fuels from municipal solid waste material are described herein. In some embodiments, a method includes combining a first waste stream that includes at least one of hard plastic, soft plastic and mixed plastic with a sorbent and increasing the temperature of the combined first waste stream and sorbent to a temperature of at least about 200° C. The method further includes combining the thermally treated first waste stream and sorbent with a second waste stream that includes fiber, and compressing the combined first waste stream, sorbent, and second waste stream to form a densified engineered fuel feedstock.

30 Claims, 7 Drawing Sheets

SYSTEMS AND METHODS FOR PRODUCING ENGINEERED FUEL FEEDSTOCKS WITH REDUCED CHLORINE CONTENT

CROSS REFERENCE TO RELATED APPLICATIONS

This application claims priority to and the benefit of U.S. Provisional Application No. 61/645,999 filed May 11, 2012, and U.S. Provisional Application No. 61/786,951, filed Mar. 15, 2013, the disclosures of each of which are incorporated by reference in their entirety.

BACKGROUND

Embodiments described herein relate generally to alternative fuels, chemicals, and engineered fuel feedstocks, and in particular, to systems and methods for producing an engineered fuel feedstock having significantly reduced chlorine content. The engineered fuel feedstock may include additives to control emissions, prevent corrosion, and/or improve operational performance during combustion or gasification applications. The feedstocks described herein include at least one component of processed municipal solid waste, an additive, and optionally other components.

Sources of fossil fuels useful for heating, transportation, and the production of chemicals as well as petrochemicals are becoming increasingly scarce and costly. Industries such as those producing energy and petrochemicals are actively searching for cost-effective engineered fuel feedstocks for use in generating those products and many others. Additionally, due to the ever increasing costs of fossil fuels, transportation costs for moving engineered fuel feedstocks for production of energy and petrochemicals is rapidly escalating.

These energy and petrochemical producing industries, and others, have relied on the use of fossil fuels, such as coal, oil and natural gas, for use in combustion and gasification processes for the production of energy, for heating and electricity, and the generation of synthesis gas used for the downstream production of chemicals and liquid fuels, as well as an energy source for turbines.

One potentially significant source of feedstock for production of an engineered fuel is solid waste. Solid waste, such as municipal solid waste (MSW), is typically disposed of in landfills or used in combustion processes to generate heat and/or steam for use in turbines. The drawbacks accompanying combustion include the production of pollutants such as nitrogen oxides, sulfur oxides, particulates and products of chlorine that are damaging to the environment. In particular, incomplete combustion of chlorinated plastics is especially hazardous since it can lead to the formation of dioxins. To reduce the formation of dioxins, it is desirable to remove the chlorine from plastics prior to combustion.

Thus, there is a need for alternative fuel feedstocks that burn cleanly and efficiently, and that can be used for the production of energy and/or chemicals. There is, at the same time, a need for waste management systems that implement methods for reducing green house gas emissions of waste in utilizing such wastes. In particular, there is a need for improved systems and methods for sorting waste material and reclaiming a resource value from components of the waste material. By harnessing and using the energy content contained in waste, it is possible to reduce green house gas emissions and/or otherwise reduce emissions generated during the processing of wastes thereby effectively using the waste generated by commercial and residential consumers.

SUMMARY

Systems and methods for producing engineered fuels from municipal solid waste material are described herein. In some embodiments, a method includes combining a first waste stream that includes at least one of hard plastic, soft plastic and mixed plastic with a sorbent and increasing the temperature of the combined first waste stream and sorbent to a temperature of at least about 200° C. The method further includes combining the thermally treated first waste stream and sorbent with a second waste stream that includes fiber, and compressing the combined first waste stream, sorbent, and second waste stream to form a densified engineered fuel feedstock.

DETAILED DESCRIPTION

Figure 1:
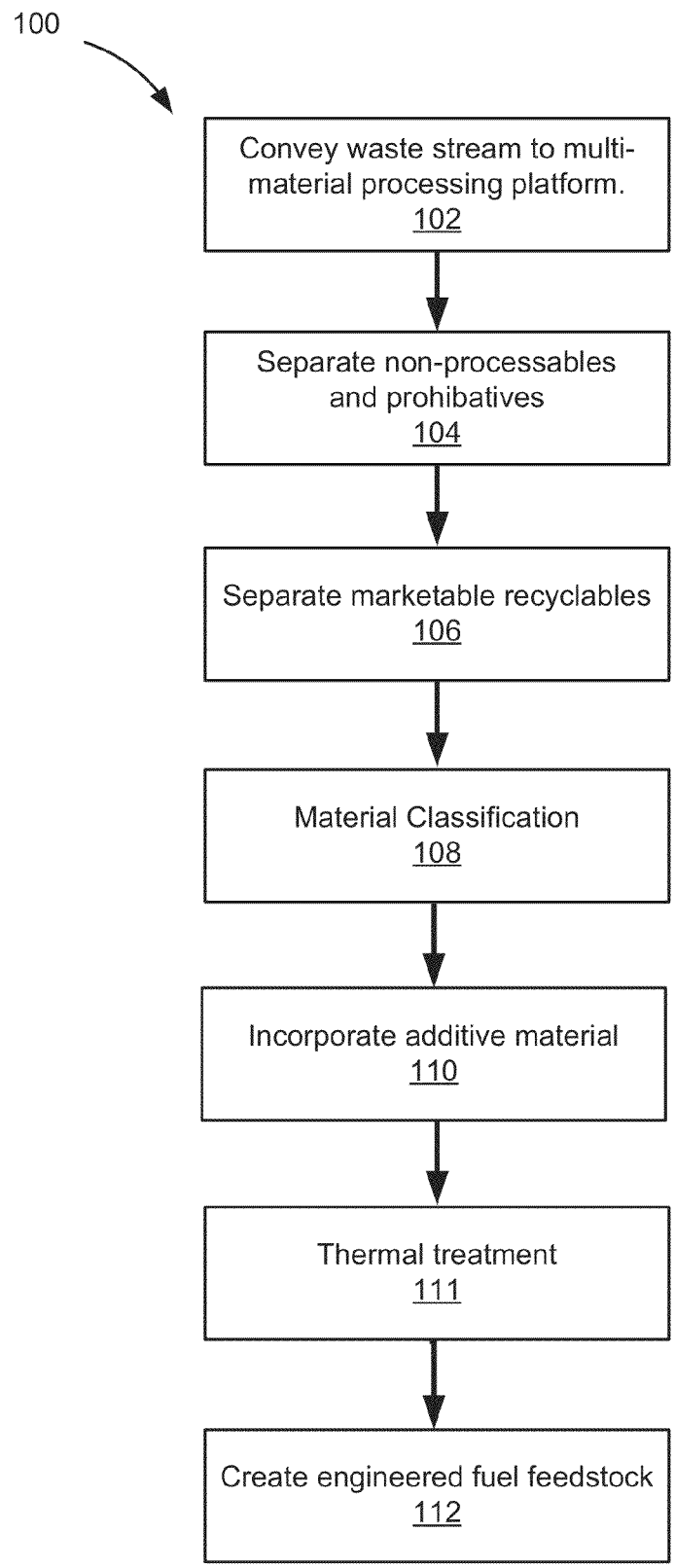
FIG. 1 is a flowchart illustrating a method for producing an engineered fuel feedstock from waste material, according to an embodiment.

Systems and methods for producing engineered fuels from municipal solid waste material are described herein. In some embodiments, a method includes receiving a waste stream at a multi-material processing platform and separating the waste stream to remove non-processable waste, prohibitive items and marketable recyclables. The method further includes conveying processable materials to a material classification system, thermally treating the classified material to reduce chlorine content and further incorporating additives to produce an engineered fuel from the constituents of the waste stream.

The term "about" when immediately preceding a numerical value means a range of plus or minus 10% of that value, e.g. "about 5" means 4.5 to 5.5, "about 50" means 45 to 55, "about 25,000" means 22,500 to 27,500, ect. Furthermore, the phrases "less than about" a value or "greater than about" a value should be understood in view of the definition of the term "about" provided herein.

The term "carbon content" means all carbon contained in the fixed carbon (see definition below) as well as in all the volatile matters in the sample.

The term "commercial waste" means solid waste generated by stores, offices, restaurants, warehouses, and other non-manufacturing, non-processing activities. Commercial waste does not include household, process, industrial or special wastes.

The term "construction and demolition debris" (C&D) means uncontaminated solid waste resulting from the construction, remodeling, repair and demolition of utilities, structures and roads; and uncontaminated solid waste resulting from land clearing. Such waste includes, but is not limited to bricks, concrete and other masonry materials, soil, rock, wood (including painted, treated and coated wood and wood products), land clearing debris, wall coverings, plaster, drywall, plumbing fixtures, non-asbestos insulation, roofing shingles and other roof coverings, asphaltic pavement, glass, plastics that are not sealed in a manner that conceals other wastes, empty buckets ten gallons or less in size and having no more than one inch of residue remaining on the bottom, electrical wiring and components containing no hazardous liquids, and pipe and metals that are incidental to any of the above. Solid waste that is not C&D debris (even if resulting from the construction, remodeling, repair and demolition of utilities, structures and roads and land clearing) includes, but is not limited to asbestos waste, garbage, corrugated container board, electrical fixtures containing hazardous liquids such as fluorescent light ballasts or transformers, fluorescent lights, carpeting, furniture, appliances, tires, drums, containers greater than ten gallons in size, any containers having more than one inch of residue remaining on the bottom and fuel tanks. Specifically excluded from the definition of construction and demolition debris is solid waste (including what otherwise would be construction and demolition debris) resulting from any processing technique, that renders individual waste components unrecognizable, such as pulverizing or shredding.

The term "devolatilization" means a process whereby a material is heated and the volatile matter is expelled. Devolatilization increases the relative amount of carbon in the engineered fuel feedstock.

The term "fiber" means materials including, but not limited to, textiles, wood, biomass, papers, fiberboard and cardboard. In addition, the term "fibers" can refer to the aforementioned materials with a bulk density of about 4 pounds per cubic foot, and generally include naturally occurring or man-made products based on woody, cellulostic or lignocellulostic biomass, plants and living stocks. In terms of chemical characteristics, the fiber materials typically have a carbon content of 35-50 wt. % with an average of about 45 wt. %, a hydrogen content of 5-7% wt. % with an average of about 6 wt. %, an oxygen content of 35-45 wt. % with an average of about 40 wt. %, and a higher heating value of about 6,000-9,000 Btu/lb with an average of about 7,500 Btu/lb, all in a dry basis.

The term "fixed carbon" is the solid combustible residue that remains after a fuel is devolatilized. The fixed-carbon content of a fuel is determined by subtracting the amount of moisture, volatile matter, and ash from a sample.

The term "garbage" means putrescible solid waste including animal and vegetable waste resulting from the handling, storage, sale, preparation, and cooking or serving of foods. Garbage originates primarily in home kitchens, stores, markets, restaurants and other places where food is stored, prepared or served.

The term "hard plastic", also referred to as rigid plastic, means plastic materials including, but not limited to, high-density polyethylene, polyethylene terephthalate, and polyvinyl chloride. In addition, the term "hard plastic" can refer to the aforementioned materials with a bulk density of about 15-25 pounds per cubic foot and actual material density of about 56-87 pounds per cubic foot.

The term "hazardous waste" means solid waste that highly exhibits one of the four characteristics of a hazardous waste (reactivity, corrosivity, ignitability, and/or toxicity) or is specifically designated as such by the EPA as specified in 40 CFR part 262.

The term "marketable recyclables" means materials for which there is an active market where the materials can be sold as commodities, including but not limited to, old corrugated cardboard (OCC), old newspaper (ONP), mixed paper, high-density polyethylene (HDPE), polyethylene terephthalate (PET), mixed plastics, ferrous metals, and/or nonferrous metals, and glass.

The term "mixed plastics" means any combination of plastics including hard plastic, soft plastic, and any other types of plastics.

The term "municipal solid waste" (MSW) means solid waste generated at residences, commercial or industrial establishments, and institutions, and includes all processable wastes along with all components of construction and demolition debris that are processable, but excluding hazardous waste, automobile scrap and other motor vehicle waste, used tires, infectious waste, asbestos waste, contaminated soil and other absorbent media and ash other than ash from household stoves. Used tires are excluded from the definition of MSW. Components of municipal solid waste include without limitation plastics, fibers, paper, yard waste, rubber, leather, wood, and also recycling residue, a residual component containing the non-recoverable portion of recyclable materials remaining after municipal solid waste has been processed with a plurality of components being sorted from the municipal solid waste.

The term "non-processable waste" (also known as non-combustible waste) means waste that does not readily gasify in gasification systems or combust in reactors, and does not give off any meaningful contribution of carbon or hydrogen into the synthesis gas generated during gasification or energy during combustion. Non-processable wastes include but are not limited to: batteries, such as dry cell batteries, mercury batteries and vehicle batteries; refrigerators; stoves; freezers; washers; dryers; bedsprings; vehicle frame parts; crankcases; transmissions; engines; lawn mowers; snow blowers; bicycles; file cabinets; air conditioners; hot water heaters; water storage tanks; water softeners; furnaces; oil storage tanks; metal furniture; and propane tanks.

The term "processed MSW waste stream" means that MSW has been processed at, for example, a materials recovery facility, by having been sorted according to types of MSW components. Types of MSW components include, but are not limited to, plastics, including soft plastics and hard plastics (e.g, #1 to #7 plastics and other polymers such as Acrylonitrile-butadiene-styrene (ABS), Polyamide (also called nylon, PA), Poly(butylene terephthalate)—PBT), fibers, paper, yard waste, rubber, leather, wood, and also recycling residue, a residual component containing the non-recoverable portion of recyclable materials remaining after municipal solid waste has been processed with a plurality of components being sorted from the municipal solid waste. Processed MSW contains substantially no glass, metals, grit, or noncombustible waste. Grit includes dirt, dust, and sand, and as such the processed MSW contains substantially no non-combustibles.

The term "processable waste" means wastes that is readily processable by equipment such as shredders, density separators, optical sorters, etc. and can be used as fuel feedstock in thermal and biological conversion processes. Processable waste includes, but is not limited to, newspaper, junk mail, corrugated cardboard, office paper, magazines, books, paperboard, other paper, rubber, textiles, and leather from residential, commercial, and institutional sources only, wood, food wastes, and other combustible portions of the MSW stream.

The term "recycling residue" means the residue remaining after a recycling facility has processed its recyclables from incoming waste which no longer contains economic value from a conventional recycling point of view.

The term "sludge" means any solid, semisolid, or liquid generated from a municipal, commercial, or industrial wastewater treatment plant or process, water supply treatment plant, air pollution control facility or any other such waste having similar characteristics and effects.

The term "soft plastics" means plastic films, bags and foams, such as low density polyethylene, expanded polystyrene, and extruded polystyrene foam. In addition, the term "soft plastic" can refer to the aforementioned materials with a bulk density of about 1-4 pounds per cubic foot and which are typically two-dimensional or flat in shape.

The term "solid waste" means unwanted or discarded solid material with insufficient liquid content to be free flowing, including, but not limited to rubbish, garbage, scrap materials, junk, refuse, inert fill material, and landscape refuse, but does not include hazardous waste, biomedical waste, septic tank sludge, or agricultural wastes, but does not include animal manure and absorbent bedding used for soil enrichment or solid or dissolved materials in industrial discharges. The fact that a solid waste, or constituent of the waste, may have value, be beneficially used, have other use, or be sold or exchanged, does not exclude it from this definition.

The term "sorbent" generally means a noncombustible material or materials added to the engineered fuel feedstock that either acts as a traditional sorbent and adsorbs a chemical or elemental by-product, or a reagent that reacts with a chemical or elemental by-product, or in other cases, simply as an additive to alter the engineered fuel feedstock characteristics such as ash fusion temperature. The term sorbent means one or more sorbents which when used in the plural can be combined together, or used in combination.

The term "volatile materials" means products, exclusive of moisture, given off by a material as a gas or vapor, when heated or not. Volatile matters include volatile organic compounds that are organic chemical compounds that have high enough vapor pressures under normal conditions to significantly vaporize and enter the atmosphere. Non-limiting examples of volatile materials include alkanes, alkenes, aldehydes, ketones, aromatics, and other light hydrocarbons.

In some embodiments, a waste management system includes a tipping floor, a screen, a primary shredder, a secondary shredder, a set of separators, a material classification subsystem, and an engineered fuel production subsystem. In some embodiments, the tipping floor can be configured to receive at least a portion of a waste stream to be processed within or by the waste management system. The screen is configured to process the incoming waste by removing undersized fraction of the waste consisting primarily of non combustibles, batteries, and food waste. The primary shredder is configured to shred the waste material to a predetermined size such that remaining non-processable and non-combustible waste can be separated from the waste stream by the set of separators. The set of separators can include a magnetic separator, an eddy current separator, an optical separator, and/or a glass separator. The secondary shredder can be configured to receive the processable waste stream and shred the processable waste to a predetermined size. Based on the chemical characteristics of waste, the material classification subsystem can be configured to further separate (i.e., classify) the processable waste and deliver the classified fibers, plastics (mixed plastics, hard plastics, and/or soft plastics) to the engineered fuel production subsystem. The engineered fuel production subsystem is configured to receive the classified waste material from the material classification subsystem and selectively produce an engineered fuel.

FIG. 1 is a flowchart illustrating a method 100 for producing an engineered fuel feedstock from municipal solid waste material. The method 100 includes conveying a waste stream to a multi-material processing platform 102. In some embodiments, the waste stream can be, for example, MSW, recycling residue, and/or any combination thereof. In some embodiments, the waste stream can be delivered to a tipping floor of a waste material receiving facility. The method 100 includes separating non-processables and prohibitives 104 from the waste stream. In some embodiments, the non-processables can be removed from the waste stream before the waste stream is conveyed to the tipping floor of the waste material receiving facility (e.g., at a previous waste handling facility).

The method 100 further includes separating marketable recyclables 106 from the waste stream. The marketable recyclables can be separated using any suitable method. In some embodiments, the marketable recyclables are separated manually (e.g., by hand). In other embodiments, the waste stream can be fed into a separator and/or series of separators. For example, in some embodiments, the separators can include a magnetic separator (e.g., to remove ferrous metals), a disc separator (e.g., to remove relatively large pieces of OCC, ONP, mixed plastics, etc.), an eddy current separator (e.g., to remove non-ferrous metals), an optical sorter separator and/or any other suitable separator (e.g. XRF sensor based separator). In this manner, materials with a sufficiently high market value can be removed (e.g., separated) from the waste stream and further processed (e.g., bailed, stored, shipped, etc.) to be sold as a marketable material. Systems and methods of processing and sorting marketable recyclables are described in U.S. Pat. No. 7,264,124 to Bohlig et al., filed Nov. 17, 2004, entitled "Systems and Methods for Sorting Recyclables at a Material Recovery Facility," U.S. Pat. No. 7,341,156 to Bohlig et al., filed Apr. 15, 2005, entitled "Systems and Methods for Sorting, Collecting Data Pertaining to and Certifying Recyclables at a Material Recovery Facility," and U.S. Patent Publication No. 2008/0290006 to Duffy et al., filed May 23, 2007, entitled "Systems and Methods for Optimizing a Single-Stream Materials Recovery Facility," the disclosures of which are hereby incorporated herein by reference, in their entireties.

With the non-processables, prohibitives and the marketable recyclables removed from the waste stream, the waste stream can be conveyed to a material classification subsystem 108. In some embodiments, the conveying of the waste stream can include passing the waste stream through at least one shredder configured to reduce the size of the constituents of the waste stream. For example, in some embodiments, the shredder can be configured to reduce the size of the constituents of the waste stream to be less than about 4 inches. In other embodiments, the shredder can be configured to reduce the size of the constituents of the waste stream to be between about 0.75 inches and about 1 inch. In still other embodiments, the shredder can be configured to reduce the size of the constituents of the waste stream to be between about 0.1875 inches and about 0.25 inches. With the size of the constituents of the waste stream reduced, the conveying of the waste stream to the material classification subsystem can further include passing the waste stream through a set of separators. In some embodiments, the set of separators can include, for example, a density separator, an optical separator, a magnetic separator, an eddy current separator, a glass separator, and/or the like. For example, in some embodiments, the shredded waste stream can pass through a density separator such that materials with a density below a predetermined threshold pass to the material classification subsystem and material with a density above the predetermined threshold pass to a secondary subsystem (e.g., further separated to remove marketable recyclables not separated in the first separation process) and/or are disposed of (e.g., conveyed to a landfill).

The material classification subsystem can be configured to further separate a desired set of materials. For example, in some embodiments, the material classification subsystem receives a waste stream including hard plastics, soft plastics, mixed plastics and/or fibers. In such embodiments, the material classification subsystem can separate the hard plastics, soft plastics, mixed plastics, and/or fibers via any suitable method. For example, in some embodiments, the material classification subsystem can include cyclonic separators, fluidized beds, density separators, optical separators, manual labor separation, and/or the like.

With the waste stream further separated by the material classification subsystem, the method 100 includes selectively mixing additive material 110 to one or more components of the separated waste stream. The additive material can include, for example, chemical additives, sorbents, biomass waste (e.g., wood), biomaterials (e.g., animal manure), and/or any other suitable additive.

After additive material has been combined with constituents of the classified waste stream (e.g. a sorbent combined with plastics), the method 100 further includes subjecting at least a portion of the plastics to thermal treatment 111 to de-volatize constituents and thermally decompose the plastic. The thermal treatment 111 can be performed at a range of temperatures below the ignition point of the plastics to drive off plasticizers, diluents, and other volatile components. The thermal treatment 111 can also be used to degrade plastics like PVC to release gases containing chlorine prior to creating the engineered fuel feedstock 112.

In some embodiments, at least a portion of the waste stream and the additive material can be compressed to form a densified intermediate material. The densified intermediate material can be in the form of cubes, briquettes, pellets, honeycomb, or other suitable shapes and forms. For example, in some embodiments, chemical additives (e.g., sorbents, nutrients, promoters, and/or the like) can be mixed with hard plastics and/or soft plastics that have been separated from the waste stream by the material classification subsystem, thermally treated and then compressed to form pellets such that the additives are evenly distributed (i.e., substantially homogeneous) and integrated (i.e., bound) within the plastic pellets. In some embodiments, the densified intermediate material can be used as an engineered fuel feedstock 112 in, for example, combustion power plants (e.g., coal burning power plants). In other embodiments, the densified intermediate material can be combined with a second portion of the waste stream (e.g., the soft plastic and/or the fiber) and processed (e.g., compressed). In still other embodiments, the densified intermediate material can be granulated and/or pulverized to any suitable particle size, combined with a second portion of the waste stream and/or additional additives, and then compressed to form a densified engineered fuel feedstock 112. In this manner, the constituents of the separated waste stream (e.g., the constituents of the waste stream after material classification) can be combined with additives (and/or portions of previously processed materials) to produce a substantially homogeneous engineered fuel feedstock that includes inseparable additives, as described in further detail herein. In other embodiments, the densified engineered fuel feedstock can be granulated and/or pulverized to any suitable particle size to form an engineered fuel feedstock 112.

Figure 2:
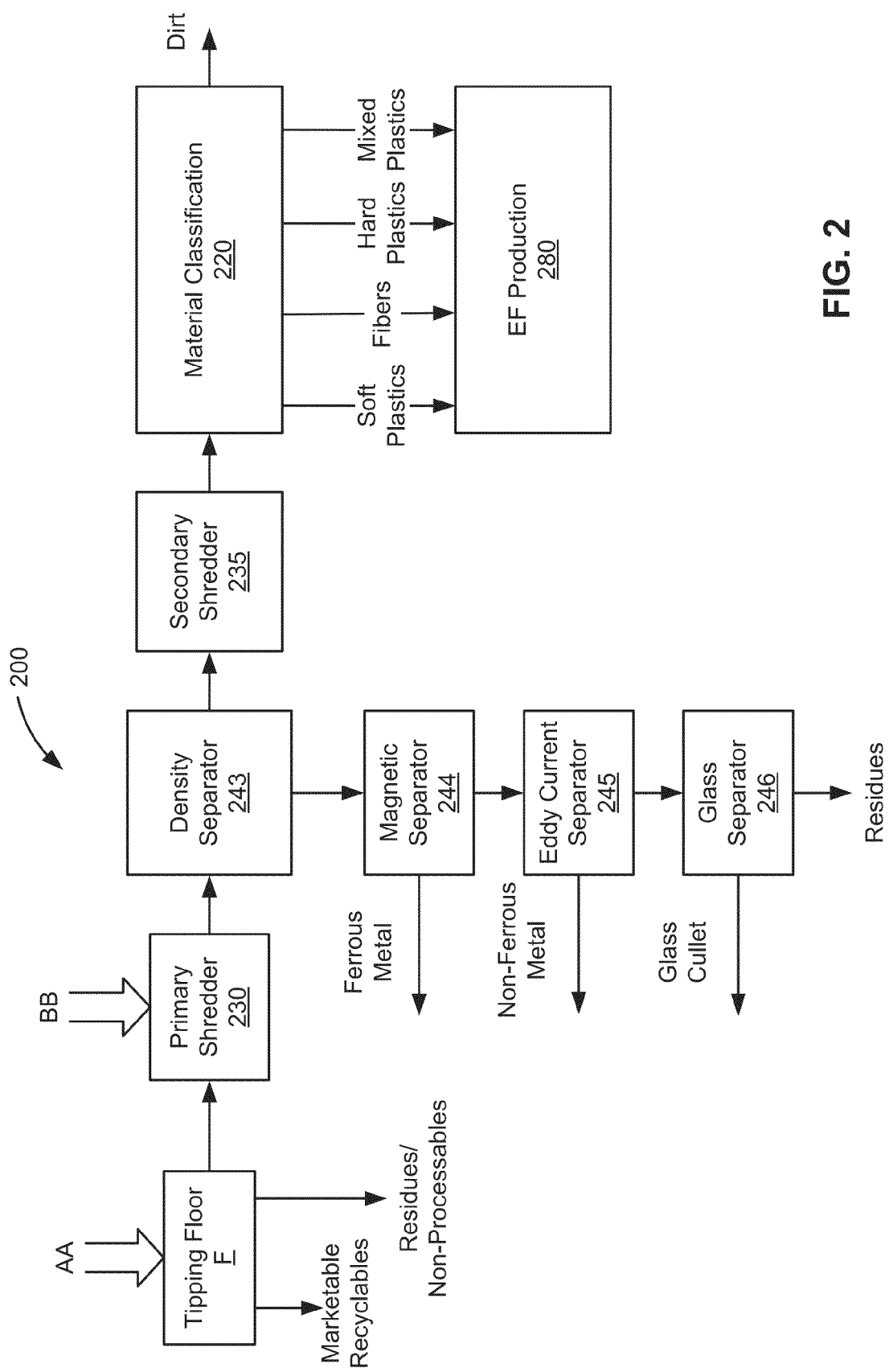
FIG. 2 is a schematic illustration of a system for producing an engineered fuel feedstock from waste material, according to an embodiment.

FIG. 2 is a schematic illustration of a system 200 for producing an engineered fuel feedstock from municipal solid waste material. The system 200 includes at least a tipping floor F, a primary shredder 230, a secondary shredder 235, a density separator 243, a magnetic separator 244, an eddy current separator 245, a glass separator 246, a material classification subsystem 220, and an engineered fuel feedstock production subsystem 280 (also referred to herein as "engineered fuel subsystem 280" or "EF subsystem 280"). In some embodiments, a waste stream is conveyed to the tipping floor F, as shown by arrow AA. The waste stream can be, for example, MSW delivered via a collection truck or recycling residue from a recycling facility. In other embodiments, the municipal solid waste can be delivered via a conveyer from a material recovery facility or other waste handling facility.

The waste stream, at least partially disposed on the tipping floor F, is configured to be separated such that non-processables, prohibitives and/or marketable recyclables (as described above) are removed (e.g., separated) from the waste stream. In some embodiments, the tipping floor is configured to have manual removal of bulky items, screen separators to remove undersized materials such as batteries, electronic parts, food waste, and noncombustibles.

While not shown in FIG. 2, the system 200 can include any number of conveyers and/or transport mechanisms configured to convey at least a portion of the waste stream from a first portion of the system 200 to a second portion of the system 200. In this manner and with the non-processables, prohibitives and the marketable recyclables removed from the waste stream, the waste stream can be conveyed to the primary shredder 230. In some embodiments, the primary shredder 230 can further be configured to receive recycling residue, as shown by the arrow BB in FIG. 2. For example, in some embodiments, the primary shredder 230 can receive the waste stream conveyed from the tipping floor F and recycling residue delivered from, for example, a material recovery facility.

The primary shredder 230 can be any suitable shredder configured to reduce the size of the constituents of the waste stream to a suitable size. For example, in some embodiments, the constituents of the waste stream can be reduced to a size less than about 10-12 inches. In other embodiments, the shredder can be configured to reduce the size of the constituents of the waste stream to be less than 4 inches, and in still other embodiments the shredder can be configured to reduce the size of the constituents of the waste stream to be between about 0.75 inches and about 1 inch.

The system 200 can further include a conveyer configured to transfer a portion of the waste stream from the primary shredder 230 to the density separator 243. The conveying of the material can be pneumatically (via air blower) or mechanically (e.g. screw conveyor). The density separator 243 can be configured such that a first set of constituents of the waste stream with a density below a predetermined density threshold (e.g., plastics and/or fibers) pass through the density separator 243 to the secondary shredder 235. A second set of constituents of the waste stream with a density above the predetermined density threshold (e.g., ferrous metals, non-ferrous metals, glass, dirt, and/or the like) are configured to pass through the density separator 243 to additional separations processes. For example, the metals, glass, dirt, etc. can be conveyed to the magnetic separator 244 where the marketable ferrous metals (e.g., steel) are recovered. The remaining metals, glass, dirt, etc. can be conveyed to the eddy current separator 245 where the marketable non-ferrous metals (e.g., aluminum) are recovered. The residual non-metallic material can then optionally be conveyed to the glass separator 246 to remove the glass particles. In some embodiments, the glass separator 246 is an optical glass separator. In other embodiments, the glass separator 246 can be any suitable separator. With the portion of the waste stream substantially free of metals and/or glass, the remaining constituents (e.g., residues) can be disposed of in, for example, a landfill, if no other beneficial use of the material can be identified. In some embodiments where recycled glass does not have a market value, the glass separator can be omitted and/or bypassed and the glass can be disposed of with the residues at a landfill, or used as daily cover material in landfill.

As described above, the first set of constituents of the waste stream (e.g., the plastics and fibers with a density below the density threshold of the density separator 243) are conveyed to the secondary shredder 235. The secondary shredder 235 can be any suitable shredder. For example, in some embodiments, the secondary shredder 235 is substantially similar to the primary shredder 230. In other embodiments, the secondary shredder 235 is different from the primary shredder 235. Furthermore, the secondary shredder 235 can be configured to shred the constituents of the waste stream to any suitable size, e.g. a smaller size than produced by the primary shredder 235. For example, in some embodiments, the secondary shredder is configured to shred the constituents to a size between about 0.375 (⅜") inches and about 0.25 (¼") inches. In other embodiments, the secondary shredder 235 can shred the constituents of the waste stream to a size less than or equal to about 0.09375 (³⁄₃₂") inches.

In some embodiments, the density separator 243 can be configured to include multiple stages and/or portions. For example, in some embodiments, the waste stream can be delivered to a screen included in the density separator 243. In such embodiments, the screen can define a predetermined mesh size and can be configured to separate the waste stream into a first portion including a constituent size of less than the mesh size and a second portion including a constituent size greater than mesh size. In some embodiments, the first portion of the waste stream can be delivered to a first density separator (not shown) and the second portion of the waste stream can be delivered to a second density separator (not shown). In some embodiments, for example, the screen can define a mesh size of about 0.25 inches. In some embodiments, the separation of the waste stream into the first portion, having the first constituent size, and the second portion, having the second constituent size, can increase the efficiency of the first density separator and/or the second separator. In such embodiments, constituents of greater size can, for example, reduce the efficiency of the first separator, cause the first separator to malfunction, and/or cause the first separator inadequately separate the constituents. With the constituents separated by the first density separator or the second density separator, the constituents with a density greater than the density threshold (e.g., ferrous metals, non-ferrous metals, glass, dirt, and/or the like) are conveyed to the set of separators, as described above. Furthermore, the constituents of the waste stream with a density below the density threshold of the first density separator and/or the second density separator (e.g., the plastics and fibers) can be conveyed to the secondary shredder 235.

In some embodiments, the waste stream can be conveyed from the secondary shredder 235 to an additional density separator configured to separate the constituents of the waste stream, as described above. In such embodiments, the additional density separator can be used to ensure the waste stream is substantially free from metals, glass, and/or any other material that can, for example, have adverse effects on the material classification subsystem 220. With the size of the constituents of the waste stream reduced to a predetermined size and the waste stream sufficiently separated, the waste stream can be transferred to the material classification subsystem 220.

The material classification subsystem 220 can be any suitable system configured to further separate (e.g., classify) a desired set of material. For example, in some embodiments, the material classification subsystem 220 receives the portion of the waste stream having a density below the density threshold of the density separator 243 (e.g., plastics and fibers). In such embodiments, the material classification subsystem 220 can separate the incoming material into, for example, hard plastic, soft plastic, and/or fiber via any suitable method including optical and/or manual separation. In some embodiments, the material classification subsystem 220 can include cyclonic separators, fluidized beds, density separators, optical sorters, manual separation and/or the like. In this manner, the material classification subsystem 220 can separate the waste stream and store the separated constituents in, for example, bunkers (not shown in FIG. 2). Additionally, bulk mixed plastics (previously sorted and processed) from industrial manufacturers and commercial institutions can be introduced into material classification subsystem 220 and used during further processing in the engineered fuel production subsystem 280.

The system 200 can further include a delivery mechanism (e.g., a conveyer) to convey the hard plastic, the soft plastic, and/or the fiber to the fuel feedstock production subsystem 280. The EF subsystem 280 can be any suitable system. For example, in some embodiments, the EF subsystem 280 can include a portion configured to deliver additives to the waste stream (e.g., chemical additives, sorbents, biomass, biomaterials, and/or the like), a milling portion, an extrusion portion, and/or any other suitable portion.

Expanding further, in some embodiments, the portion of the waste stream (e.g., the hard plastic, soft plastic, and/or fiber) can be mixed with the additives and compressed to form, for example, a densified intermediate material, as described above. In this manner, the constituents of the separated waste stream (e.g., the constituents of the waste stream conveyed from the material classification subsystem 220) can be combined with additives and/or portions of processed materials and processed to produce an engineered fuel feedstock, as described in further detail herein.

Figure 3:
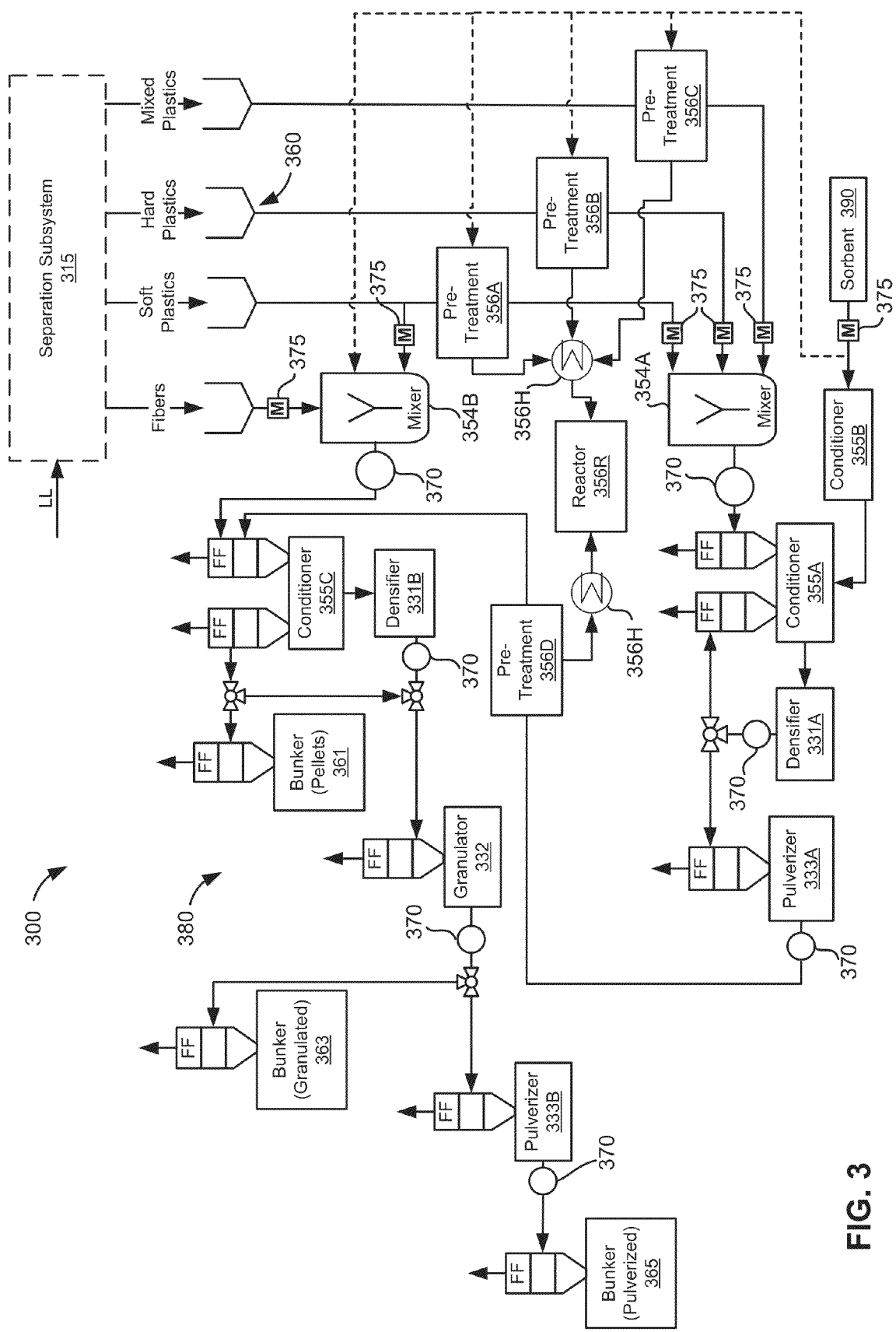
FIG. 3 is a schematic illustration of a system for producing an engineered fuel feedstock from waste material, according to an embodiment.

FIG. 3 is a schematic illustration of a system 300 for producing an engineered fuel feedstock from municipal solid waste material. The system 300 can include at least a separation subsystem 315 and an engineered fuel feedstock production subsystem 380 (also referred to herein as "engineered fuel subsystem 380" or "EF subsystem 380" or "Advanced Product Manufacturing (APM) subsystem 380"). In some embodiments, a waste stream can be transferred to the separation subsystem 315, as shown by arrow AA in FIG. 3. The waste stream can be, for example, municipal solid waste (MSW) delivered via a collection truck or recycling residue from a recycling facility. In other embodiments, the municipal solid waste can be delivered via a conveyer from a material recovery facility or other waste handling facility. The separation subsystem 315 can be configured to separate the waste stream that nonprocessables and/or marketable recyclables are removed (e.g., separated) from the waste stream. Expanding further, the separation subsystem 315 can be any of the systems described in the U.S. Patent Publication No. US2012/0304536 or any combination thereof. In some embodiments, the separation subsystem 315 can include any number of separators (e.g., magnetic separators, eddy current separators, glass separators, fluidized bed separators, cyclonic separators, optical separators, and/or the like), shredders and granulators. In this manner, the separation subsystem 315 can receive a waste stream (e.g., MSW and/or recycling residue) and transfer separated constituents of the waste stream into bunkers 360. For example, in some embodiments, the separation subsystem 315 can include a first bunker configured to store hard plastics, a second bunker configured to store soft plastics, a third bunker configured to store fibers, and a fourth bunker configured to store mixed plastics. In this manner, the system 300 can further include a delivery mechanism (e.g., a conveyers, tubes, pipes, channels, and/or the like) to convey the hard plastics, the soft plastics, mixed plastics and/or the fibers to the EF subsystem 380.

The EF subsystem 380 can be any suitable system for combining the classified waste materials with additives in predetermined ratios to produce an engineered fuel feedstock. The EF subsystem 380 can include, for example, a portion configured to deliver additives to the waste stream (e.g., chemical additives, sorbents, biomass, biomaterials, and/or the like), conditioners, mixers, conveyers, densifiers, granulators, pulverizers, storage bunkers, kilns and/or any other suitable devices or systems.

In some embodiments, at least a portion of the waste stream can be delivered to the EF subsystem 380 to produce an engineered fuel feedstock. Expanding further, in some embodiments, the separation subsystem 315 can be configured to deliver a given quantity of the hard plastics to the EF subsystem 380. In such embodiments, the hard plastics can be passed through a pre-treatment mechanism 356A. The pre-treatment mechanism 356A can be, for example, a heater configured to raise the temperature of the hard plastics. In some embodiments, the pre-treatment mechanism 356A can receive at least a portion of a sorbent 390. The EF subsystem 380 can further include a set of mixers 354A and 354B configured to receive at least a portion of the waste stream delivered by the separation subsystem 315 and metering devices 375 configured to control the flow of the waste stream into the mixers 354A and 354B. In some embodiments, a soft plastic portion delivered to the mixer 354A can be first directed to a pre-treatment mechanism 356B. In some embodiments, a mixed plastic portion delivered to the mixer 354A can be first directed to a pre-treatment mechanism 356C.

In some embodiments, the pre-treatment mechanism 356A, 356B, 356C and/or 356D (collectively referred to herein as "pre-treatment mechanisms 356") can be a direct or indirect heating subsystem operated at atmospheric conditions, with an inert atmosphere, or under reduced-oxygen pyrolytic conditions. For example, in some embodiments, the pre-treatment mechanisms 356 can be a rotary kiln or the like. In this manner, the pre-treatment process can be configured to substantially de-volatize constituents within the plastics such as, for example, polyvinylchloride (PVC). Expanding further, in some embodiments, the pre-treatment mechanism 356A can be configured to thermally process the plastic to approximately 300 degrees Celsius such that a portion of chlorine contained in the PVC is released, with the released gas to be further treated (not shown). In other embodiments, the pre-treatment mechanisms 356 can be configured to heat at least a portion of the plastics to a temperature from about 200 to about 400 degrees Celsius inclusive of all ranges and subranges therebetween. In still other embodiments, the pre-treatment mechanisms 356 can be configured to receive a gas stream such as nitrogen.

In some embodiments, the pre-treatment mechanisms 356 can be configured to heat at least a portion of the plastics, for a given time or range of times including those listed below, to a temperature between about 200° C. to about 230° C., about 230° C. to about 260° C., about 260° C. to about 290° C., about 290° C. to about 320° C., about 320° C. to about 350° C., about 350° C. to about 380° C., and about 380° C. to about 400° C. In other embodiments, the pre-treatment mechanisms 356 can be configured to heat at least a portion of the plastics, for a given time or range of times including those listed below, to a temperature of about 200° C., about 230° C., about 260° C., about 290° C., about 320° C., about 350° C., about 380° C., and about 400° C.

In some embodiments, the pre-treatment mechanisms 356 can be configured to heat at least a portion of the plastics to a given temperature or range of temperatures, including the aforementioned temperatures and ranges of temperatures, for between about 10 minutes to about 20 minutes, about 20 minutes to about 30 minutes, about 30 minutes to about 40 minutes, about 40 minutes to about 50 minutes, about 50 minutes to about 60 minutes, about 70 minutes to about 80 minutes, about 80 minutes to about 90 minutes, about 90 minutes to about 120 minutes, about 120 minutes to about 150 minutes, about 150 minutes to about 180 minutes, about 180 minutes to about 210 minutes, and about 210 minutes to about 240 minutes. In other embodiments, the pre-treatment mechanisms 356 can be configured to heat at least a portion of the plastics to a given temperature or range of temperatures, including the aforementioned temperatures and ranges of temperatures, for about 10 minutes, about 20 minutes, about 30 minutes, about 40 minutes, about 50 minutes, about 60 minutes, about 70 minutes, about 80 minutes, about 90 minutes, about 120 minutes, about 150 minutes, about 180 minutes, about 210 minutes, and about 240 minutes.

In some embodiments, the pre-treatment mechanisms 356 can be configured to thermally process the plastics through a range of temperatures for a given period of time. For example, in some embodiments, the plastics can be heated to 250 degrees Celsius and held for 10 minutes, then heated to 275 degrees Celsius and held for 15 minutes, and then heated to 300 degrees Celsius and held for 20 minutes. In some embodiments, the plastics can be heated to a predetermined temperature (e.g., 300 degrees Celsius) and held at that temperature for a predetermined time (e.g., 20 minutes). In some embodiments, the temperature of the plastics can be raised according to a predetermined temperature profile (e.g., constant or substantially constant) over the course of the residence time in the pre-treatment mechanism. In some embodiments, the temperature and/or residence time of the pre-treatment process can be determined (e.g., in real time) as a function of the amount of chorine or hydrogen chloride ("HCl") gas being released from the plastics. In some embodiments, the pre-treatment mechanism can be configured to thermally process only the hard plastics, the soft plastics, mixed plastics, or a combination thereof. In other embodiments, a sorbent can be added to the pre-treatment mechanism as shown in FIG. 3. The sorbent can be configured to facilitate the flow of the plastics through the pre-treatment process. The sorbent can be any suitable sorbent described herein, for example, in some embodiments, the sorbent can be hydrated lime, Trona, sodium bicarbonate, or a combination thereof. In this manner, the pre-treatment mechanisms 356 can be configured to substantially remove volatile constituents from the plastics (e.g., chlorine). For example, in some embodiments, the pre-treatment mechanisms 356 can be configured to remove at least 70%, 75%, 80%, 85%, 90%, or 95% of the chlorine content included in PVC. In some embodiments, the pre-treatment mechanism 356 can be configured to remove enough chlorine so that the final engineered fuel feedstock product has a chlorine content of less than about 2,000 ppm, 1,900 ppm, 1,800 ppm, 1,700 ppm, or 1,600 ppm. In some embodiments, a sufficient amount of chorine is removed so that the final engineered fuel feedstock product has a chlorine content of less than 1,919 ppm which is the 90$^{th}$ percentile of chlorine concentration in the EPA's coal database. In some embodiments, a sufficient amount of chorine is removed so that the final engineered fuel feedstock product has a chlorine content of less than 1,622 ppm which is the 75$^{th}$ percentile of chlorine concentration in the EPA's coal database. In some embodiments, a sufficient amount of chorine is removed so that the final engineered fuel feedstock product has a chlorine content meeting the legitimacy criteria for fuels in 40 CFR 241.3(d)(1).

Gases from the pre-treatment mechanisms 356 can be sent to any suitable reactor, sorbent-packed adsorption reactor, thermal oxidizer, wet scrubber, selective catalytic reduction reactor, other pollution control device including filters, dry scrubbers, or the like configured to receive and/or neutralize the evaporated constituents (e.g., the chlorine). Prior to receiving the gases, heat exchanger 356H can be used to cool or heat the gases before being introduced to reactor 356R. Heat exchanger 356H is any suitable condenser, radiator, or preheater used to alter the temperature of the gases. In some embodiments, heat exchanger 356H is a condenser used to cool the gases before being sent to a reactor 356R packed with Trona or other sorbents. The gases can react with sorbents within the reactor to form a less reactive state or less reactive compounds. Sorbents within the reactor can also be used to adsorbed the gases and effectively neutralize them.

The mixers 354A and 354B can be any suitable device such as a paddled continuous mixer, a rotary continuous mixer, a screw conveyor, an auger conveyor mixer, a mechanically vibrating mixer, and/or an agitating mixer. In some embodiments, the separation subsystem 315 can deliver a first waste stream including hard plastics and a second waste stream including soft plastics to the first mixer 354A. In such embodiments, the first mixer 354A is configured to mix a metered amount of the hard plastics with a metered amount of the soft plastics. In this manner, the first mixer 354A can deliver the mixed waste stream to a blower 370 configured to feed the waste stream to a first conditioner 355A. In other embodiments, the hard plastics can be configured to pass through the first mixer 354A and remain substantially unmixed (e.g., the metering mechanism 375 does not supply a quantity of the soft plastics). In this manner, a waste stream including substantially only hard plastics can be delivered to the first conditioner 355A, as further described herein.

The first conditioner 355A can be any suitable device and/or system configured to condition at least a portion of the waste stream for engineered fuel feedstock production. For example, in some embodiments, the first conditioner 355A can be configured to increase the temperature of the constituents of the waste stream (e.g., the hard plastics). In some embodiments, the first conditioner 355A can be configured to increase the moisture of the constituents of the waste stream. In some embodiments, the first conditioner 355A can receive the portion of the waste stream and a set of additives. The additives can be chemical additives (e.g., sorbents, nutrients, promoters, and/or the like), biomass waste (e.g., wood), biomaterials (e.g., animal manure), and/or any other suitable additive or additives, in solid or solution form (e.g., urea, acetic acid, calcium bromide, ammonium bromide, sodium bromide, etc.).

In some embodiments, the sorbent 390 can be configured to alter the combustion properties of the engineered fuel feedstock. For example, in some embodiments, the sorbent 390 can be configured to absorb sulfur dioxide ($SO_2$). In other embodiments, the sorbent 390 can be configured to absorb and/or neutralize odors, burn with a given color, and/or the like. In some embodiments, the sorbent 390 can be conditioned by a second conditioner 355B prior to being delivered to the first conditioner 355A. In such embodiments, the second conditioner 355B can be configured to, for example, raise the temperature of the sorbent 390. Examples of additives that can be incorporated into the engineered fuel feedstock using the subsystem 380 include trisodium hydrogendicarbonate dihydrate or sodium sesquicarbonate (Trona), sodium bicarbonate, sodium carbonate, zinc ferrite, zinc copper ferrite, zinc titanate, copper ferrite aluminate, copper aluminate, copper managanese oxide, nickel supported on alumina, zinc oxide, iron oxide, copper, copper (I) oxide, copper (II) oxide, calcium bromide, ammonium bromide, sodium bromide, iodine containing compounds, urea, limestone, lime, hydrated lime, Fe, FeO, $Fe_2O_3$, $Fe_3O_4$, iron filings, $CaCO_3$, $Ca(OH)_2$, $CaCO_3.MgO$, soda, silica, alumina, china clay, kaolinite, bauxite, emathlite, attapulgite, coal ash, egg shells, organic salts (such as calcium magnesium acetate (CMA), calcium acetate (CA), calcium formate (CF), calcium benzoate (CB), calcium propionate (CP) and magnesium acetate (MA)) and Ca-montmorillonite.

The first conditioner 355A can further be configured to deliver the conditioned waste stream and additives to a first densifier 331A. The first densifier 331A can be any suitable device configured to encapsulate at least a portion of the sorbent 390 within the plastics. For example, in some embodiments, the first densifier 331A can be an extrusion device configured to apply a relatively high pressure to (e.g., compress) the plastics and the sorbent 390 such that the sorbent 390 becomes evenly distributed (e.g., substantially homogenous) and/or encapsulated within the plastics. Furthermore, the first densifier 331A can be configured to produce a densified intermediate material. The densified intermediate material can be in the form of cubes, briquettes, pellets, honeycomb, or other suitable shapes and forms. In some embodiments, the densified intermediate material can be used as an engineered fuel feedstock in, for example, combustion power plants (e.g., coal burning power plants). In other embodiments, the densified intermediate material can be returned to the first conditioner 355A such as to further incorporate the sorbent 390 (e.g., raise the sorbent 390 content within the pellet and/or the rigidity of the pellet). With the desired amount of sorbent 390 encapsulated within the plastics, a blower 370 can deliver the densified intermediate material from the first densifier 331A to a first pulverizer 333A.

The first pulverizer 333A can be any suitable device configured to reduce the densified intermediate material (e.g., pellets) to a relatively fine powder, such as, for example, ³⁄₃₂ of an inch, ¹⁄₁₆ of an inch, or less. With the densified intermediate material pulverized, a blower 370 can deliver the pulverized material to a third conditioner 355C. In some embodiments, the third conditioner 355C can be substantially similar to the first conditioner 355A. Furthermore, the system 300 includes a second mixer 354B configured to deliver a second waste stream from the separation subsystem 315. In some embodiments, the second mixer 354B can be configured to mix a portion of soft plastics with a portion of fibers. In other embodiments, the second mixer 354B is configured to only mix soft plastics or fibers with the pulverized material. In this manner, the third conditioner 355C is configured to condition (e.g., heat, humidify, and/or add solutions to) the pulverized material and the soft plastics and/or fibers and deliver the conditioned materials to the second densifier 331B.

In some embodiments, the second densifier 331B can be any suitable densifier. In some embodiments, the second densifier 331B can be substantially similar to the first densifier 331A. For example, in some embodiments, the second densifier 331B can be an extrusion device configured to apply a relatively high pressure to the materials such that the pulverized intermediate material (i.e. encapsulated sorbent and plastics) becomes encapsulated in the waste material (e.g., soft plastics, and/or fibers). In this manner, the second densifier 331B can be configured to produce an engineered fuel feedstock. In some embodiments, the fuel feedstock can be returned to the second conditioner 355A such as to further incorporate the soft plastics and/or fibers or increase the pellets rigidity. In some embodiments, recirculation can ensure a desired amount of conditioning (e.g., during a startup process when a densifier can be relatively cold). With the desired amount of sorbent 390 encapsulated within the waste material (e.g., hard plastics, soft plastics, and/or fibers) a blower 370 can deliver the fuel feedstock from the second densifier 331B to a first pellet bunker 361. Expanding further, in some embodiments, the second densifier 331B can be configured to densify the material into an engineered fuel pellet. In some embodiments, the engineered fuel pellets can be stored in the first pellet bunker 361.

In some embodiments, it can be desirable to reduce the size of the engineered fuel pellets. In such embodiments, the blower 370 can be configured to deliver the engineered fuel pellets to a granulator 332. In this manner, the granulator 332 can reduce the size of the engineered fuel pellets and produce a granulated fuel feedstock. The granulated fuel feedstock can have an average particle size of about 1-5 mm for fluidized bed applications, or 5-15 mm for circulating fluidized bed applications. In some embodiments, the granulated fuel feedstock can be delivered to a granulated fuel bunker 363, as shown in FIG. 3. In other embodiments, it can be desirable to further reduce the size of the granulated fuel feedstock. In such embodiments, a blower 370 can deliver the granulated fuel feedstock to a second pulverizer 333B. In this manner, the second pulverizer 333B can reduce the size of the granulated fuel feedstock to a relatively fine fuel stock. The pulverized fuel feedstock can have an average particle size of about 100 microns to 3,000 microns. Furthermore, a blower 370 can be configured to deliver the fuel stock powder to a powdered fuel bunker 365. Therefore, the system 300 can be configured to produce an engineered fuel feedstock for a variety of conditions (e.g., the pelletized fuel stock, the granulated fuel stock, and/or the pulverized fuel stock).

Figure 4:
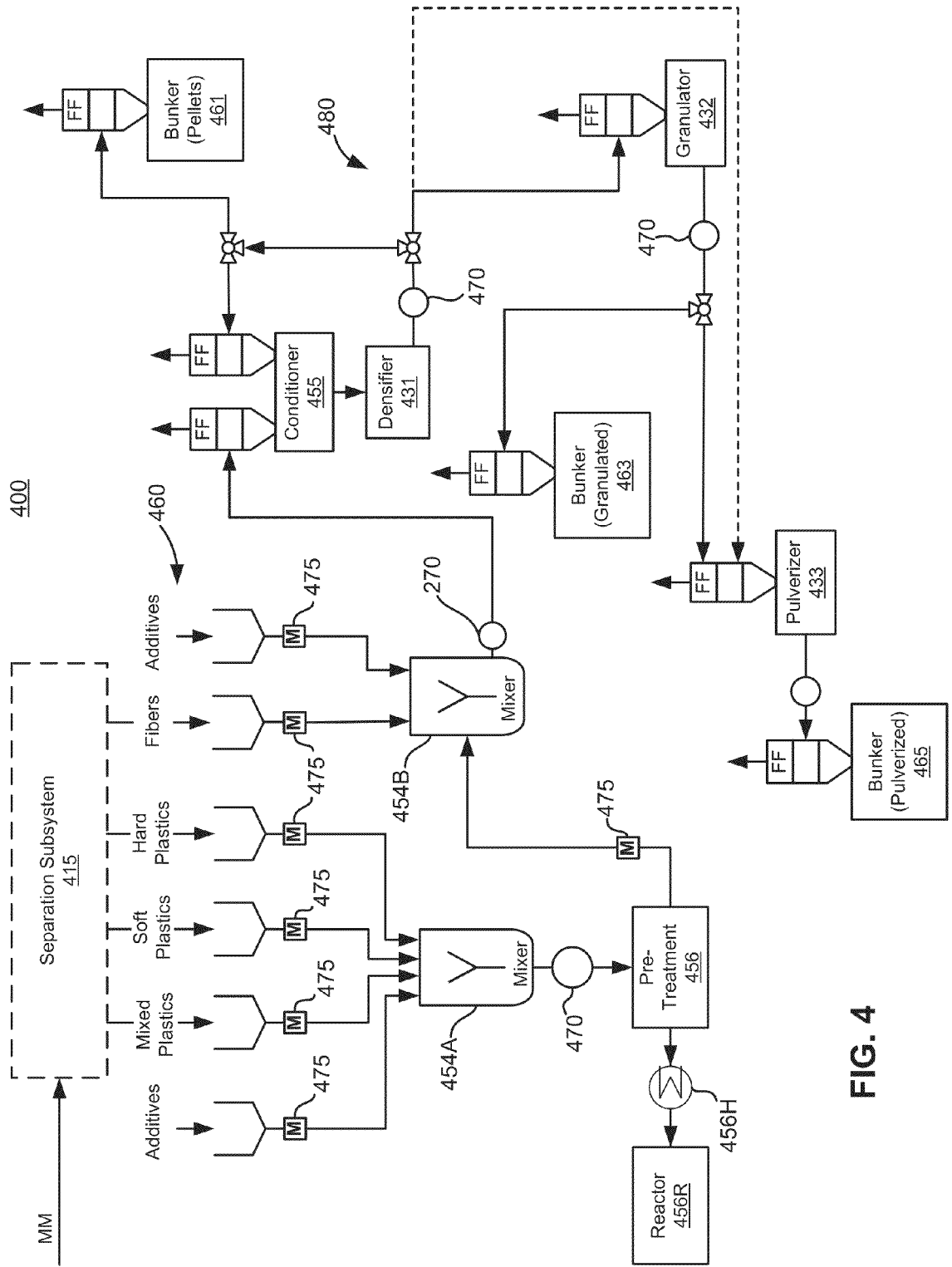
FIG. 4 is a schematic illustration of a system for producing an engineered fuel feedstock from waste material, according to an embodiment.

FIG. 4 is a schematic illustration of a system 400 for producing an engineered fuel feedstock from municipal solid waste material. The system 400 includes a separation subsystem 415 and a fuel feedstock production subsystem 480 (also referred to herein as "Advanced Product Manufacturing" (APM) 480). The separation subsystem 415 can be substantially similar to the separation subsystem 315 described above with respect to FIG. 3. Similarly, the APM 480 can include similar components as the APM 380. Therefore, certain components of the APM 480 are not described in detail herein and should be considered substantially similar to the corresponding component of the APM 380 unless explicitly described as different.

As shown in FIG. 4, the separation subsystem 415 can be configured to separate the constituents of a waste stream. In this manner, the separation subsystem 415 can include a set of bunkers configured to store, for example, hard plastics, soft plastics, mixed plastics, fibers, and additives (e.g., any of the additives described above). In this manner, at least a portion of the waste stream can be delivered to the APM subsystem 480 to produce an engineered fuel feedstock. Expanding further, in some embodiments, the separation subsystem 415 can be configured to deliver a given quantity of the hard plastics, soft plastics, mixed plastics, and/or additives to the EF subsystem 480. In such embodiments, the plastics (e.g., the hard and soft plastics) and the additives are passed through metering devices 475 configured to control the amount of the hard plastic, soft plastic, mixed plastics, and/or additive to be added to a first mixer 454A. The first mixer 454A can be any suitable device such as a paddled continuous mixer, a rotary continuous mixer, a screw conveyor, an auger conveyor mixer, a mechanically vibrating mixer, and/or an agitating mixer. In this manner, the first mixer 454A can mix the hard plastics, the soft plastics, mixed plastics, and the additives and deliver the plastics and additives to a pre-treatment mechanism 456.

The pre-treatment mechanism 456 can be any suitable pre-treatment mechanism such as, for example, the pre-treatment mechanism 356 described above. In this manner, the pre-treatment mechanism 456 can receive the plastics and the additives and thermally process the mixture to de-volatize the plastics contained therein. Furthermore, the pre-treatment mechanism can 456 can include and/or be operably coupled to a heat exchanger 456H and reactor 456R configured to vent, neutralize, store, or otherwise interact with the evaporated constituent of the plastic. For example, in some embodiments, the pre-treatment mechanism 456 can be configured to de-volatize PVC, thereby releasing chlorine in the form of HCl gas. In such embodiments, the heat exchanger 456H can include a condenser that cools the HCl gas prior to being sent to reactor 456R that can include a Trona bed configured to substantially neutralize the HCl gas. The HCl gas can react with the Trona bed to form the less reactive salt compound NaCl. Sorbents within the reactor 456R can also be used to adsorbed the HCl gas. In this manner, the reactor 456R can be configured to store, reuse, process, and/or otherwise discard the decomposed and evaporated constituents of the plastics. In some embodiments, the HCl gas can be reacted with other chemicals and/or further processed to produce marketable products (e.g., hydrochloric acid).

The system 400 further includes a second mixer 454B configured to receive the treated plastics and additives. Moreover, the separation subsystem 415 can be configured to deliver a portion of fibers to the second mixer 454B such that the fibers are mixed with the treated plastics and additives (see, e.g., FIG. 8). In this manner, a mixed waste stream (e.g., including the treated plastics and additives and the fibers) can be delivered to a conditioner 455, as further described herein.

The conditioner 455 can be any suitable device and/or system configured to condition at least a portion of the waste stream for engineered fuel feedstock production. For example, in some embodiments, the conditioner 455 can be configured to increase the temperature of the constituents of the waste stream (e.g., the fiber and the capsulated plastics/sorbent). In some embodiments, the conditioner 455 can be configured to increase the moisture of the constituents of the waste stream.

The conditioner 455 can further be configured to deliver the conditioned waste stream and additives to a densifier 431. The densifier 431 can be any suitable device configured to encapsulate at least a portion of the additives into the plastics and fibers. For example, in some embodiments, the densifier 431 can be an extrusion device configured to apply a relatively high pressure (e.g., compress) to the mixture (e.g., plastics, fibers, and additives) such that the additives become evenly distributed (e.g., substantially homogenous) and/or encapsulated within the plastics and fibers. Furthermore, the densifier 431 can be configured to produce a densified intermediate material. The densified intermediate material can be in the form of cubes, briquettes, pellets, honeycomb, or other suitable shapes and forms. In some embodiments, the densified intermediate material can be used as an engineered fuel feedstock in, for example, combustion power plants (e.g., coal burning power plants). In other embodiments, the densified intermediate material can be returned to the conditioner 455 such as to further incorporate the additives and/or fibers. With the desired ratio of plastics, additives, and fibers produced a blower 470 can deliver a portion of the densified intermediate material (see, e.g., FIG. 9) from a bunker 461 for storage.

In some embodiments, it can be desirable to reduce the size of the intermediate material. In such embodiments, the blower 470 can be configured to deliver the engineered fuel pellets to a granulator 432. In this manner, the granulator 432 can reduce the size of the engineered fuel pellets and produce a granulated fuel feedstock (see, e.g., FIG. 10). The granulated fuel feedstock can have an average particle size of about 1-5 mm for fluidized bed applications, or 5-15 mm for circulating fluidized bed applications. In some embodiments, the granulated fuel feedstock can be delivered to a granulated fuel bunker 463, as shown in FIG. 4. In other embodiments, it can be desirable to further reduce the size of the granulated fuel feedstock. In such embodiments, a blower 470 can deliver the granulated fuel feedstock to a pulverizer 433. In this manner, the pulverizer 433 can reduce the size of the granulated fuel feedstock to a relatively fine fuel stock. The pulverized fuel feedstock can have an average particle size of about 100 microns to 3,000 microns. Furthermore, a blower 470 can be configured to deliver the fuel stock powder to a powdered fuel bunker 465. Therefore, the system 400 can be configured to produce an engineered fuel feedstock for a variety of conditions (e.g., the pelletized fuel stock, the granulated fuel stock, and/or the pulverized fuel stock).

Figure 5:
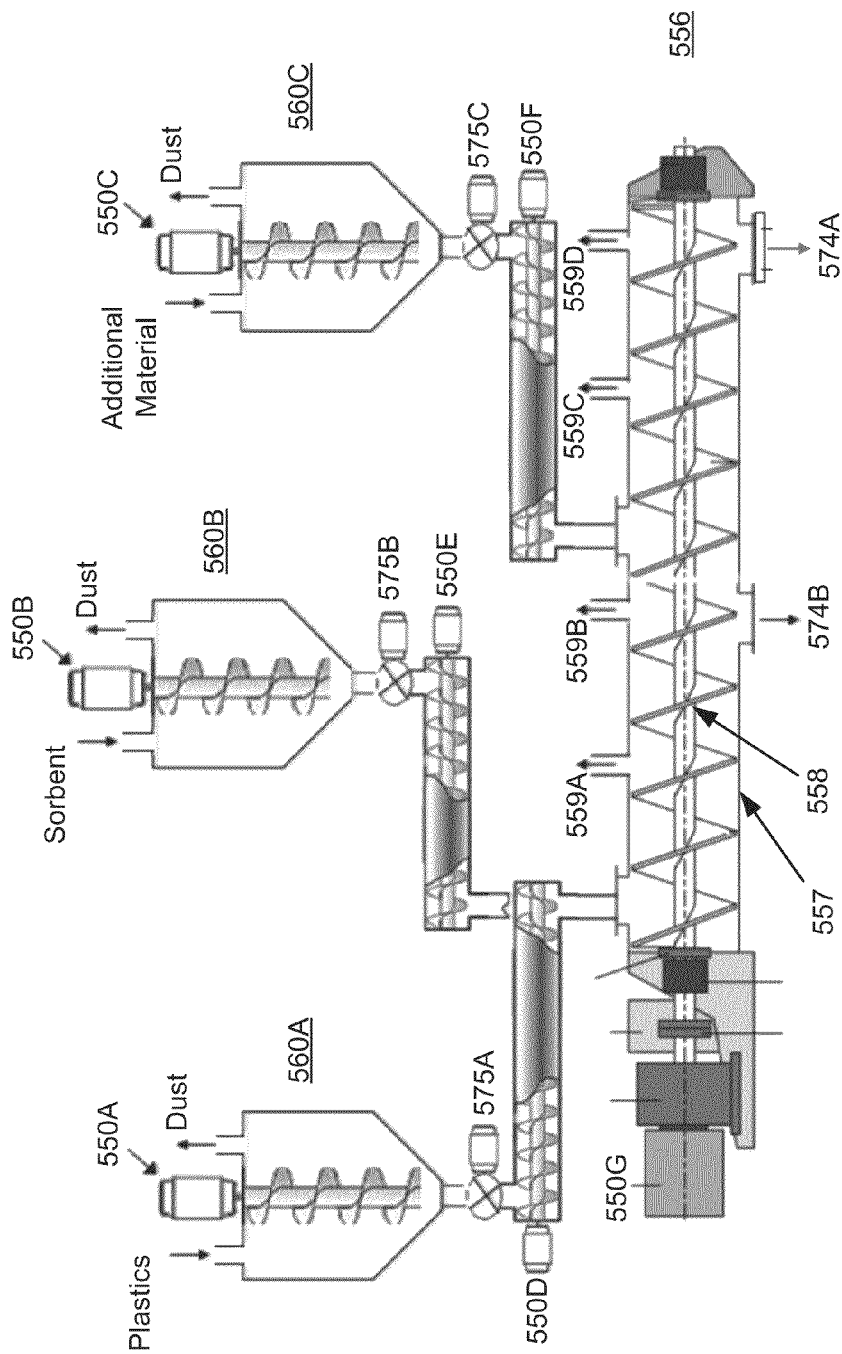
FIG. 5 is an illustration of a pre-treatment mechanism used in producing an engineered fuel feedstock from waste material, according to an embodiment.

An exemplary embodiment of a pre-treatment mechanism for use in a system 300, 400 for producing an engineered fuel feedstock from municipal solid waste material is shown in FIG. 5. As described herein, examples of a suitable pre-treatment mechanisms 556 for thermally treating plastics include heated screw conveyors, rotary kilns, rotary dryers, screw roasters, and other thermal treatment vessels. As shown, a motor 550A can be used to discharge soft plastic, hard plastic, or mixed plastic stored in a bunker 560A through a metering device 575A. Similarly, a motor 550B can be used to discharge sorbents stored in a bunker 560B through a metering device 575B. Additional motors 550D and 550E can be used to convey and/or otherwise transport the plastic and sorbent to the pre-treatment mechanism 556. In some embodiments, other conveyance mechanisms (e.g., gravity feed) can be used to transport the plastics, sorbents, or other materials to the pre-treatment mechanism 556. The metering devices 575A and 575B allow the plastics and sorbents to be combined in predetermined proportions to optimize the performance of the pre-treatment mechanism 556 and/or customize the output of the engineered fuel feedstock production system (e.g., system 300 or 400). Furthermore, combining the sorbent with the plastics prior to thermal treatment prevents caking and formation of plastic agglomerations, and prevents the plastic from sticking to surfaces of the pre-treatment mechanism 556.

In some embodiments, the feed rate of plastic and sorbent to the pre-treatment mechanism 556 is controlled so that a treatment chamber 557 of the pre-treatment mechanism 556 is only partially (e.g. half way) filled with the plastic and sorbent mixture to allow room for the evolved gases to collect in the headspace and reduce the contact time between the gases and sorbent, and gas entrainment in the plastic mixture.

The evolved gases can then be extracted via one or more ports 559A, 559B, 559C and 559D (collectively referred to herein as "gas ports 559") disposed along the top of the treatment chamber 557. In some embodiment, the gas ports can be disposed at other locations in the treatment chamber 557. In some embodiments, the pre-treatment mechanism 556 can be configured to transfer heat energy to the plastic and sorbent through the exterior surface of the treatment chamber 557. In other words, the pretreatment mechanism 556 can be externally heated by one or more heat sources including electrical resistance, steam, hot water, or gas burners. The plastic and sorbent can be heated as it contacts the inner walls of the treatment chamber 557. In some embodiments, an auger 558 can be configured to convey the plastic and sorbent through the treatment chamber 557 and mix the material to increase the heat transfer rate. In some embodiments, the auger 558 can define a fluid pathway (not shown) and a heat transfer fluid can be pumped through the fluid pathway to transfer heat energy to the plastic and sorbent mixture from the inside of the treatment chamber 557. In some embodiment, a heated gas can be introduced into the pre-treatment mechanism 556 to heat the plastic and sorbent (e.g., a fluidized bed). After being heated for a predetermined time and to a predetermined temperatures, the thermally treated mixture can be discharged out of the pre-treatment mechanism 556 through one or more discharge ports 574A, 574B. The discharge ports 574A and 574B can be disposed and configured to allow portions of the thermally treated mixture to be removed from the treatment chamber 557 at different points depending on the thermal treatment conditions and/or the chlorine content of the mixture. For example, if the plastic and sorbent only require minimal thermal treatment, discharge port 574B can be used to increase overall throughput of material through the pre-treatment mechanism 556.

Optionally, a third bunker 560C can store additional materials for feeding into the pre-treatment mechanism 556. Suitable additional materials include plastics, sorbents, additives, fibers and combinations thereof. A motor 550C can be used to discharge the additional material from the bunker 560C through a metering device 575C and fed into the pre-treatment mechanism 556 by a conveyor powered by motor 550F.

Figure 6:
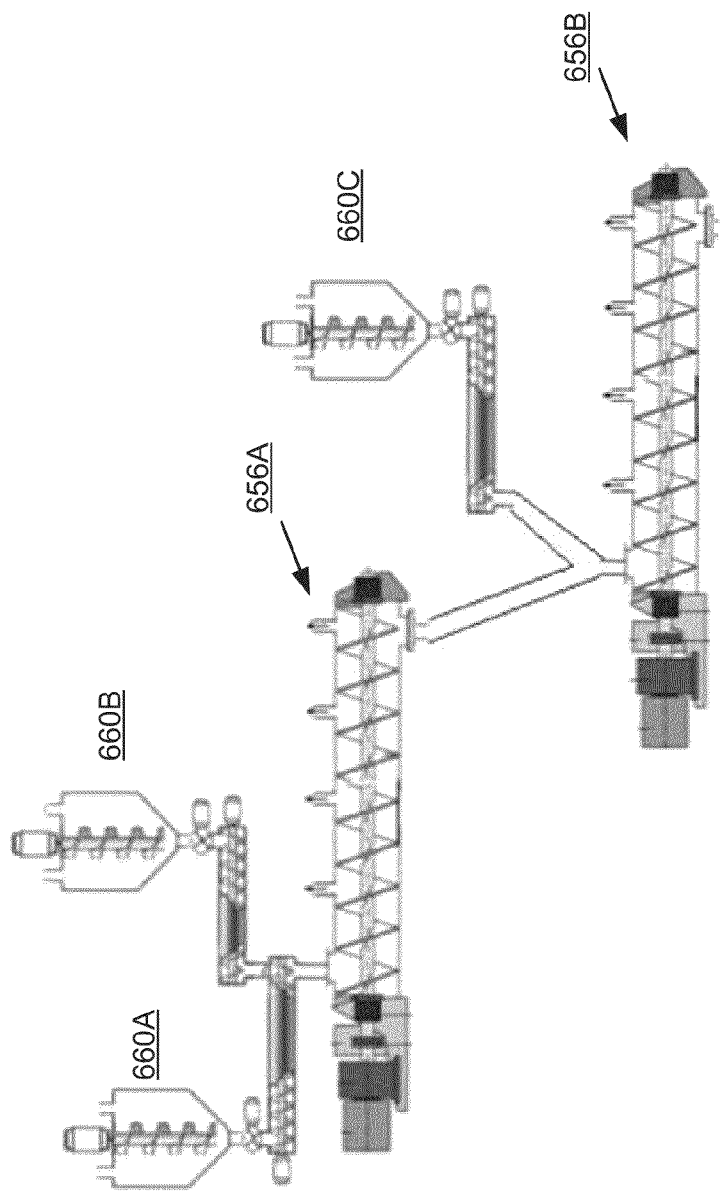
FIG. 6 is an illustration of a pre-treatment mechanism used in producing an engineered fuel feedstock from waste material, according to an embodiment.

An exemplary embodiment of a pre-treatment mechanism for use in a system 300, 400 for producing an engineered fuel feedstock from municipal solid waste material is shown in FIG. 6. As shown, two pre-treatment mechanisms 656A and 656B are coupled together to thermally treat plastic materials from a municipal solid waste stream. Either or both of the two pre-treatment mechanisms 656A and 656B can be substantially similar to the pre-treatment mechanism 556 described above with reference to FIG. 5. In this "two-stage" thermal treatment system, the materials stored in bunkers 660A and 660B (e.g., plastics and sorbent) can be treated at a first set of conditions within pre-treatment mechanism 656A, and then optionally, materials stored in bunker 660C can be added to the mixture from the first pre-treatment mechanism 656A and then treated at a second set of conditions within pre-treatment mechanism 656B. Similarly, additional pre-treatment mechanisms can be coupled together in serial or parallel to provide additional capacity and/or ranges of treatment conditions.

Figure 7:
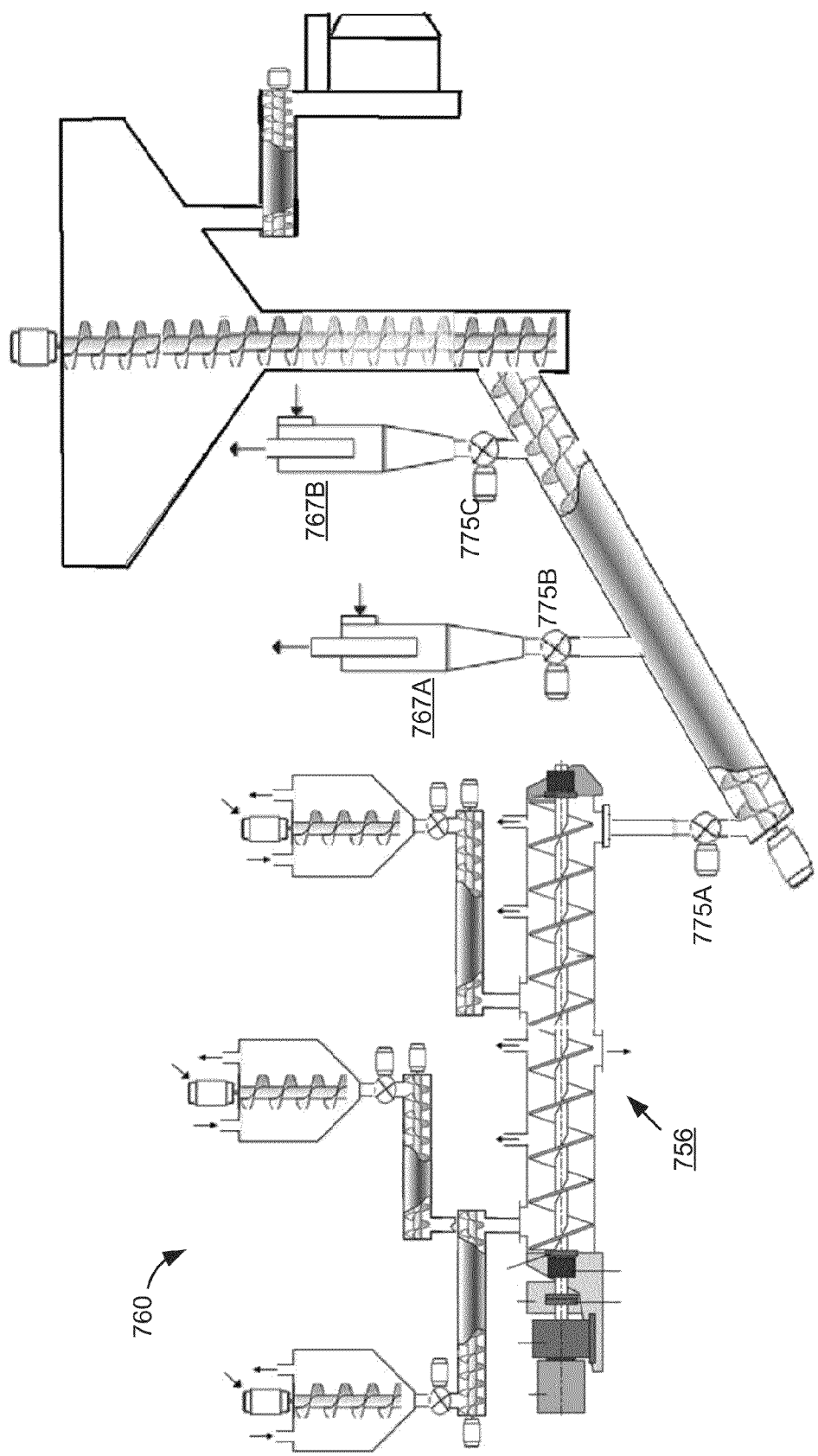
FIG. 7 is an illustration of a pre-treatment mechanism used in producing an engineered fuel feedstock from waste material, according to an embodiment.

FIG. 7 shows another embodiment where materials stored in bunkers 760 can be fed into pre-treatment mechanism 756. After thermal treatment, the materials can be discharged through metering device 775A. Storage bunkers 767A and 767B can hold additional materials and can be transported through metering devices 775B and 775C positioned after the thermal treatment process. For example, plastic and sorbent can be thermally treated in pre-treatment mechanism 756, and fiber can be added from bunker 767A and/or additives can be added from bunker 767B. In another example, plastic and sorbent can be thermally treated in the pre-treatment mechanism 756 and additional plastic can be added from bunker 767A and/or additional sorbent can be added from bunker 767B. In yet another example, plastic and sorbent can be thermally treated in pre-treatment mechanism 756 and recycling residue can be added from bunker 767A and/or ash can be added from bunker 767B. In yet another example, plastic, sorbent, and fiber can be thermally treated in pre-treatment mechanism 756, and recycling residue can be added from bunker 767A and/or additives can be added from bunker 767B.

As described herein, in some embodiments, the combined first waste stream and additive can be combined with a second and/or third waste stream to form an engineered fuel feedstock. For example, the second waste stream can include hard plastic, soft plastic, or mixed plastic and the third waste stream can include fibers. In some embodiments, the second waste stream includes plastics and fibers. In some embodiments, the second waste stream includes less than about 20 wt. %, 10 wt. %, or 5 wt. % hard plastic. In some embodiments, the second waste stream includes at least about 5 wt. %, 10 wt. %, or 20 wt. % soft plastic. In some embodiments, the second waste stream includes at least about 80 wt. %, 90 wt. %, or 95 wt. % fibers. In some embodiments, the second waste stream includes at least about 95 wt. % soft plastic and fibers in combination. In some embodiments, the second waste stream is substantially free from glass, metals, grit, and noncombustibles. In some embodiments, the final engineered fuel feedstock can have a bulk density of between about 10 lb/ft$^3$ and about 60 lb/ft$^3$. In some embodiments, the final engineered fuel feedstock can have a bulk density of between about 20 lb/ft$^3$ and about 40 lb/ft$^3$.

As described herein, during the separation and classification process, various components of the waste streams can be shredded with a primary shredder and optionally a secondary shredder. In some embodiments, the hard plastic component of the waste stream has an average particle size of less than about ½ inch, ⅜ inch, ¼ inch, ³⁄₁₆ inch, ⅛ inch or ³⁄₃₂ inch. In some embodiments, the hard plastic component of the waste stream has an average particle size in the range between about ³⁄₃₂ inch and about ¼ inch. In some embodiments, the hard plastic component of the waste stream has an average particle size in the range between about ³⁄₃₂ inch and about ⅜ inch. In some embodiments, the hard plastic, soft plastic, or mixed plastic components of the waste stream have an average particle size in the range between about ³⁄₃₂ inch and about ¾ inch. In some embodiments, the soft plastic component of the waste stream has an average particle size in the range between about ⅛ inch and about ⅜ inch. In some embodiments, the fiber component of the waste stream has an average particle size in the range between about ⅛ inch and about ⅜ inch. In some embodiments, the fiber and soft plastic components of the waste stream have an average particle size in the range between about ⅛ inch and about ⅜ inch.

In some embodiments, the waste streams or individual components of the waste stream are conditioned one more times during the engineered fuel feedstock production process. For example, the conditioning can include adding heat to raise the temperature of the waste stream, adding water to raise the raise the moisture content of the waste stream, or adding steam to raise the temperature and the moisture content of the waste stream. In some embodiments, the temperature of one or more of the waste streams can be raised to about 150° C., 160° C., 175° C., or 190° C. In some embodiments, the moisture content of one or more of the waste streams can be raised to at least about 5%, 10% or 15%

As described herein, one or more waste streams can be combined with an additive and then compressed to form a densified engineered fuel feedstock in a single pass (see, e.g., FIG. 4), or one or more waste streams can be combined with an additive and then compressed to form a densified intermediate material, ground, and then combined with additional waste streams before being compressed for second time to form a densified engineered fuel feedstock (see, e.g., FIG. 3). In some embodiments, the densified intermediate material and/or the densified engineered fuel feedstock can be ground (e.g., granulated or pulverized) to an average particle size of less than about ¾ inch, ⅝ inch, ½ inch, ⅜ inch, ¼ inch, ³⁄₁₆ inch, ⅛ inch, ³⁄₃₂ inch.

As described herein, an engineered fuel feedstock made from a processed MSW waste stream can include a hard plastic content of between about 0 wt. % and about 40 wt. %, a soft plastic content of between about 0 wt. % and about 40 wt. %, a fiber content of between about 30 wt. % and about 80 wt. %, and a sorbent content of between about 5 wt. % and about 50 wt. %. In some embodiments, the hard plastic content is between about 0 wt. % and about 20 wt. %, between about 5 wt. % and about 20 wt. %, between about 10 wt. % and about 20 wt. %, between about 5 wt. % and about 15 wt. %, or between about 10 wt. % and about 15 wt. %. In some embodiments, the soft plastic content is between about 0 wt. % and about 20 wt. %, between about 5 wt. % and about 20 wt. %, between about 10 wt. % and about 20 wt. %, between about 5 wt. % and about 15 wt. %, or between about 10 wt. % and about 15 wt. %. In some embodiments, the fiber content is between about 30 wt. % and about 60 wt. %, between about 40 wt. % and about 60 wt. %, or between about 40 wt. % and about 50 wt. %. In some embodiments, the sorbent content is between about 10 wt. % and about 40 wt. %, between about 20 wt. % and about 40 wt. %, or between about 30 wt. % and about 40 wt. %.

As described herein, an engineered fuel feedstock made from a processed MSW waste stream can include a mixed plastic content of between about 10 wt. % and about 40 wt. %, a fiber content of between about 30 wt. % and about 80 wt. %, and a sorbent content of between about 5 wt. % and about 50 wt. %. In some embodiments, the mixed-plastic content is between about 0 wt. % and about 20 wt. %, between about 5 wt. % and about 20 wt. %, between about 10 wt. % and about 20 wt. %, between about 5 wt. % and about 15 wt. %, or between about 10 wt. % and about 15 wt. %. In some embodiments, the fiber content is between about 30 wt. % and about 60 wt. %, between about 40 wt. % and about 60 wt. %, or between about 40 wt. % and about 50 wt. %. In some embodiments, the sorbent content is between about 10 wt. % and about 40 wt. %, between about 20 wt. % and about 40 wt. %, or between about 30 wt. % and about 40 wt. %.

Examples

By way of example, a fuel production process can include passing a waste stream (e.g., hard plastics, soft plastics, mixed plastics, and/or fibers) and additives (e.g., sorbents, biomass, biomaterials, and/or the like) through a densifier any number of times to incorporate the additive into waste material. Passing the waste stream/additive mixture through the densifier or pelletizer multiple times increases the temperature of the constituents to facilitate incorporation of the additive into the waste material constituents. The engineered fuel production process can also include conditioners as described above to raise the temperature of the mixture prior to densification. In other examples, the sorbent can be selected to generate heat when mixed with the waste materials and/or water (e.g., quick lime).

The hard plastic pellets containing the sorbent were then passed through a granulator to reduce the size of the engineered fuel pellets and produce a granulated fuel feedstock having an average particle size in the range of about 0.004-0.04 inches. The granulated intermediate material (37.5 wt. % of total) was mixed with 6.5 wt. % plastic and 56 wt. % fibers and passed through a pelletizer 10 times to produce densified pellets of engineered fuel feedstock containing 14 wt. % plastic, 56 wt. % fiber and 30 wt. % sorbent.

Engineered fuel pellets can be used in the pellet form, passed through a granulator to reduce the size of the engineered fuel pellets and produce a granulated fuel feedstock having an average particle size of about 0.04 inches or in the range of about 0.008-0.12 inches, or passed through a pulverizer to reduce the size of the fuel feedstock to a relatively fine fuel stock having an average particle size of about 0.02 inches or in the range of about 0.008-0.08 inches.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. Similarly, where methods and/or events described above indicate certain events and/or procedures occurring in certain order, the ordering of certain events and/or procedures may be modified. While the embodiments have been particularly shown and described, it will be understood that various changes in form and details may be made.

For example in reference to FIG. 3, while specific waste streams are described as entering the first mixer 354A and the second mixer 354B, the waste streams can be introduced to the first mixer 354A or second mixer 354B in any given configuration. For example, in some embodiments, the first mixer 354A can be configured to receive only hard plastics, only soft plastics, only mixed plastics, and/or any suitable combination thereof. Similarly, in some embodiments, the second mixer 355B can be configured to receive only soft plastics, only fibers, only mixed plastics and/or any suitable combination of plastics and fibers. Furthermore, the any constituent configuration of the first mixer 354A can be used with any constituent configuration of the second mixer 354B.

Although various embodiments have been described as having particular features and/or combinations of components, other embodiments are possible having a combination of any features and/or components from any of embodiments as discussed above.

The invention claimed is:

1. A method of producing an engineered fuel feedstock from a processed MSW waste stream, the method comprising:
   combining a first waste stream that includes at least one of hard plastic, soft plastic and mixed plastic with a sorbent;
   increasing the temperature of the combined first waste stream and sorbent to a temperature in a range of about 200° C. to about 400° C.;
   combining the thermally treated first waste stream and sorbent with a second waste stream, the second waste stream including fiber; and
   compressing the combined first waste stream, sorbent, and second waste stream to form a densified engineered fuel feedstock.

2. The method of claim 1, wherein the temperature of the combined first waste stream and sorbent is increased for at least about 10 minutes.

3. The method of claim 2, wherein the temperature of the combined first waste stream and sorbent is increased to at least about 30 minutes.

4. The method of claim 1, wherein the temperature of the combined first waste stream and sorbent is increased to at least about 350° C.

5. The method of claim 1, wherein the first waste stream includes a hard plastic and a soft plastic.

6. The method of claim 1, wherein the second waste stream includes fiber.

7. The method of claim 1, further comprising:
   processing the engineered fuel feedstock to an average particle size of less than about ¼ inch.

8. The method of claim 1, wherein increasing the temperature of the combined first waste stream and sorbent de-volatizes the constituents of the waste stream.

9. The method of claim 1, wherein the step of increasing the temperature of the combined first waste stream and sorbent takes place in a heated screw conveyor, rotary kiln, rotary dryer, screw roaster, or other thermal treatment vessel.

10. A method of producing an engineered fuel feedstock from processed MSW waste streams, the method comprising:
    heating a first classified waste stream including plastics to a temperature that is above a decomposition point and below an ignition point of the plastics to produce a second waste stream and a gas;
    extracting the gas from the second waste stream;
    reacting the gas to a less reactive state;
    combining the second waste stream with a third waste stream in a predetermined ratio to form an engineered fuel feedstock.

11. The method of claim 10, wherein the first waste stream includes a chlorinated plastic.

12. The method of claim 10, wherein the third waste stream includes fiber.

13. The method of claim 10, wherein the first waste stream is heated to temperature in a range from about 200° C. to about 350° C.

14. The method of claim 10, wherein the gas includes chlorine.

15. The method of claim 14, wherein the gas includes at least one of HCl, dioxins, and chlorine gas.

16. The method of claim 15, wherein reacting the gas to a less reactive state includes reacting the gas with $Na_3(CO_3)(HCO_3).2H_2O$ to form NaCl.

17. The method of claim 10, wherein the chlorine content of the second waste stream is less than about 500 ppm.

18. The method of claim 10, wherein the first waste stream includes a sorbent.

19. The method of claim 18, wherein the sorbent is at least one of sodium sesquicarbonate (Trona), sodium bicarbonate, sodium carbonate, zinc ferrite, zinc copper ferrite, zinc titanate, copper ferrite aluminate, copper aluminate, copper manganese oxide, nickel supported on alumina, zinc oxide, iron oxide, copper, copper (I) oxide, copper (II) oxide, limestone, lime, Fe, FeO, $Fe_2O_3$, $Fe_3O_4$, iron filings, $CaCO_3$, $Ca(OH)_2$, $CaCO_3.MgO$, silica, alumina, china clay, kaolinite, bauxite, emathlite, attapulgite, coal ash, egg shells, organic salts (such as calcium magnesium acetate (CMA), calcium acetate (CA), calcium formate (CF), calcium benzoate (CB), calcium propionate (CP) and magnesium acetate (MA)), urea, calcium bromide, sodium bromide, ammonium bromide, hydrogen bromide, ammonium sulfate, lignosulfonate and Ca-montmorillonite.

20. The method of claim 10, wherein the first waste stream is about 50% to about 90% by weight of sorbent.

21. The method of claim 10, wherein the gas includes at least one of plasticizers, diluents, and VOC's.

22. The method of claim 10, wherein the chlorine content of the second waste stream is less than about 500 ppm.

23. An engineered fuel feedstock produced by the method of claim 1, comprising:
   a plastic content of between about 5 wt. % and about 50 wt. %;
   a fiber content of between about 50 wt. % and about 95 wt. %;
   a sorbent content of between about 1 wt. % and about 50 wt. %; and
   a total chlorine content of less than 400 ppm.

24. The engineered fuel feedstock of claim 23, wherein the plastic content is between about 10 wt. % and about 30 wt. %.

25. The engineered fuel feedstock of claim 23, wherein the plastic content is between about 6 wt. % and about 38 wt. %.

26. The engineered fuel feedstock of claim 25, wherein the plastic content is between about 11 wt. % and about 14 wt. %.

27. The engineered fuel feedstock of claim 23, wherein the fiber content is between about 70 wt. % and about 90 wt. %.

28. The engineered fuel feedstock of claim 23, wherein the fiber content is between about 30 wt. % and about 71 wt. %.

29. The engineered fuel feedstock of claim 28, wherein the fiber content is between about 44 wt. % and about 56 wt. %.

30. The engineered fuel feedstock of claim 23, wherein the sorbent content is between about 23 wt. % and about 40 wt. %.

* * * * *